Patented July 19, 1949

2,476,615

UNITED STATES PATENT OFFICE 2,476,615

CONDUIT MANIFOLD

Richard Moese, Detroit, Mich.

Application April 19, 1947, Serial No. 742,656

4 Claims. (Cl. 285—210)

This invention relates to new and useful improvements in manifold structures and more particularly to such a structure formed or built up from a plurality of plates or sheet members of impervious material.

An object of the invention is to provide a structure having one or more passageways formed in or by one or more of the plate members.

Another object is to provide a passageway structure capable of transmitting high fluid pressures.

Another object is to provide a structure in which the plate members may serve to support in rigidly fixed position one or more control devices actuated by fluid pressure conveyed by the plate member passageways.

The invention consists in the improved construction and combination of parts to be more fully described hereinafter and the novelty of which will be particularly pointed out and distinctly claimed.

Figure 1:
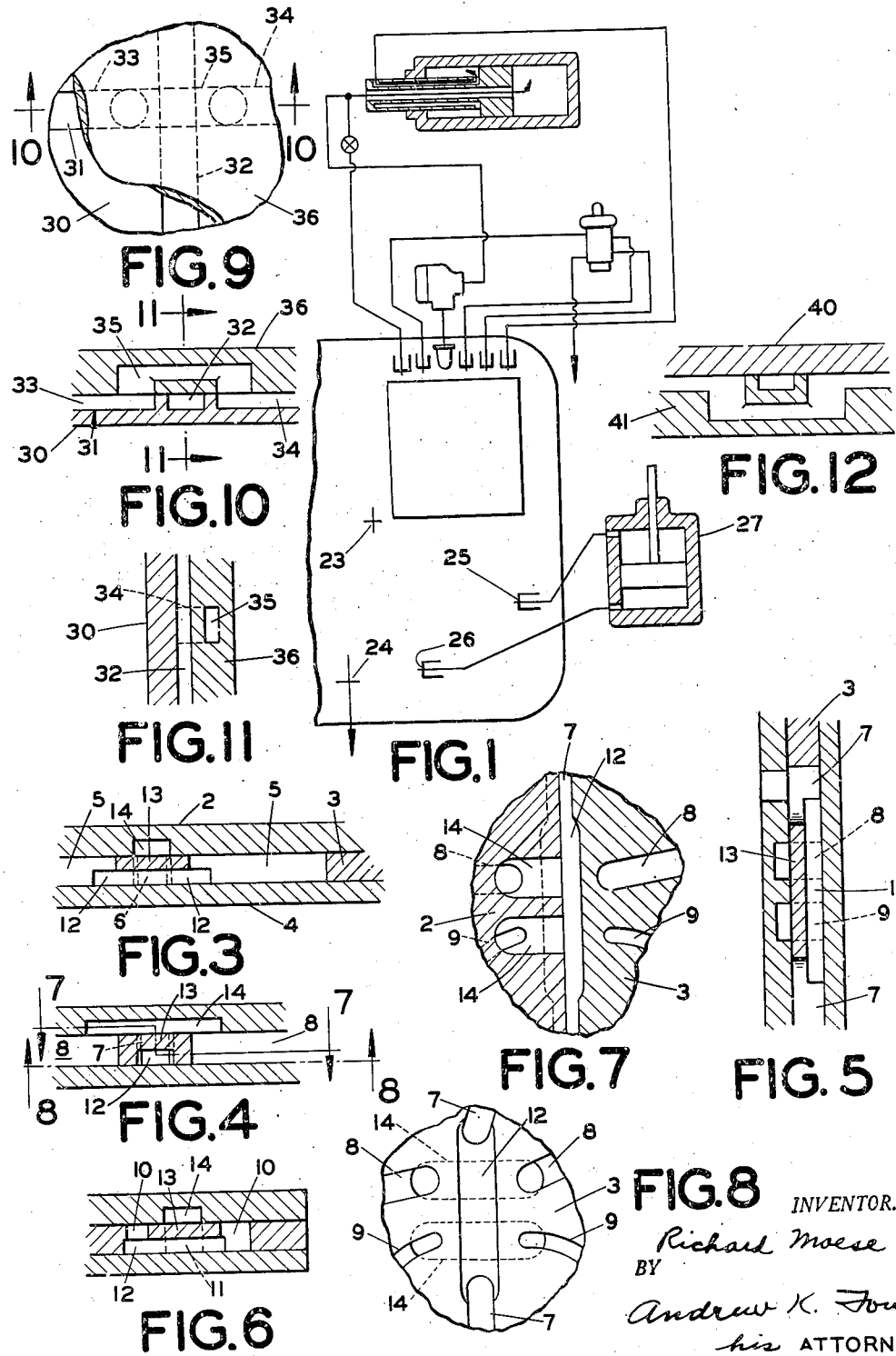
Figure 2:
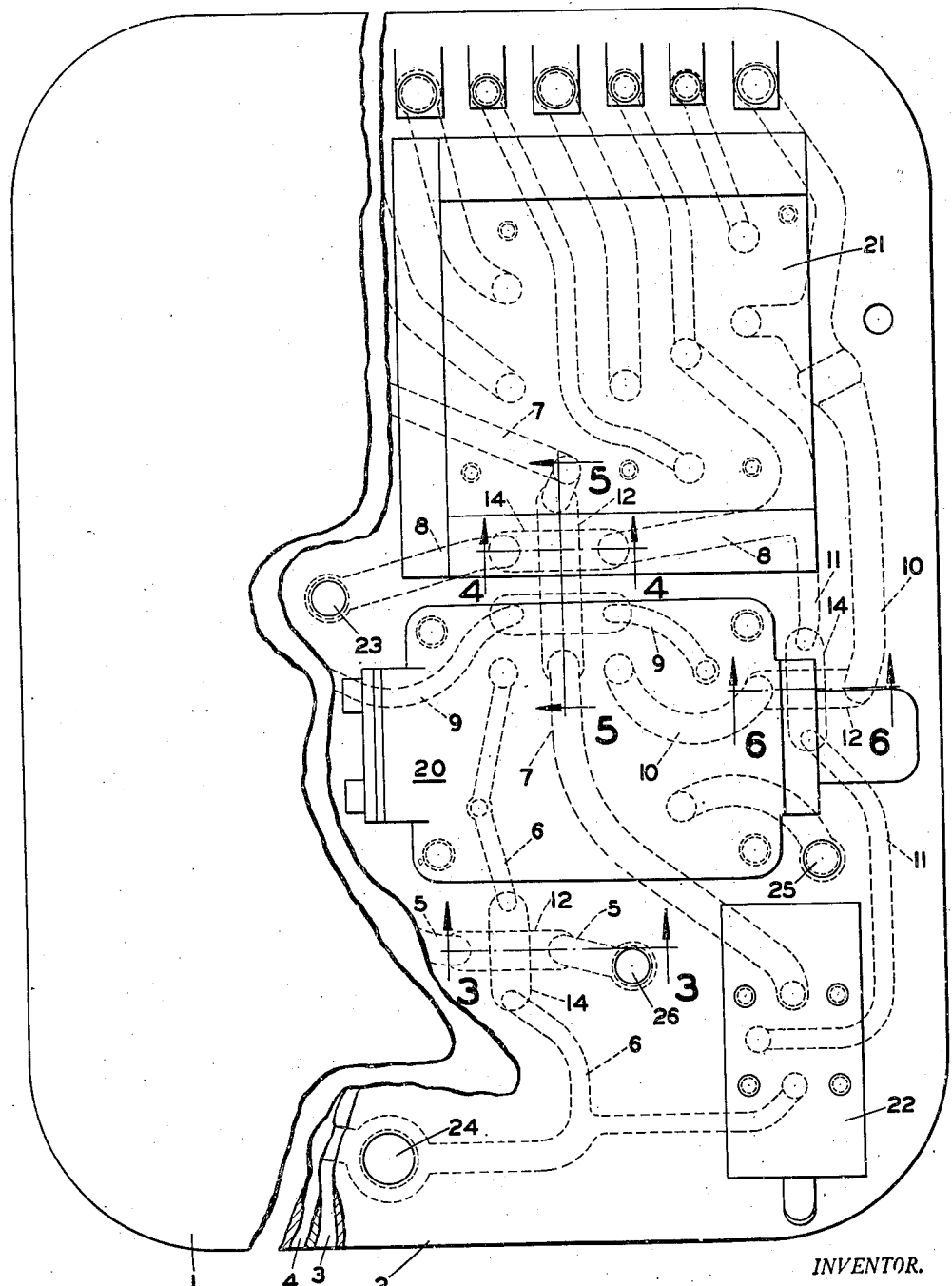

In the accompanying drawings to be taken as a part of this specification, there are fully and clearly illustrated several preferred embodiments of the invention, in which drawings, Figure 1 is a schematic view of a fluid pressure controlling system including the manifold structure of this invention, Fig. 2 is an enlarged view of the manifold structure showing certain of the passageways in dotted lines and showing certain control devices communicating with the passageways and supported by the structure.

Figs. 3, 4, 5 and 6 are detail views in section on the lines 3—3, 4—4, 5—5 and 6—6 respectively of Fig. 2, Fig. 7 is a detail view in section on the line 7—7 of Fig. 4, Fig. 8 is a detail sectional view on the line 8—8 of Fig. 4, looking in the direction of the arrows, Fig. 9 is a plan view of another form of structure formed by two plates, Fig. 10 is a detail view in section on the line 10—10 of Fig. 9, Fig. 11 is a detail view in section on the line 11—11 of Fig. 10, and Fig. 12 is a sectional view similar to Fig. 10 but showing a different passageway arrangement.

Referring to the drawings by character of reference, the numeral 1 designates a laminated manifold structure of a plurality of heavy metal plates or impervious sheet material members 2, 3 and 4, which are joined in surface sealed bonded engagement, such as by brazing or the like. However, it has been found desirable to effect the bonding by hydrogen furnace brazing of the surfaces together so as to seal together all contiguous surface points and enable high fluid pressures to be successfully confined and conveyed. Hydrogen furnace brazing further serves to eliminate oxidation and scale.

Prior to bonding and sealing of the plate surfaces together, the intermediate plate or member 3 has the desired passageways such as 5 and 6; 7, 8 and 9; and 10 and 11 cut therethrough in the form of slots, as by means of a cutting torch, for example. Each of these pairs or groups of passageways, it will be noted, are in intersecting relationship but it may be desirable to divorce them from intercommunication at their intersecting points which is accomplished as follows: The passageways 6, 8, 9 and 11 dead-end at spaced points adjacent and on opposite sides of their transverse passageways 5, 7 and 10, see Fig. 7, for example. The passageways 5, 7 and 10 also at spaced points, adjacent and on opposite sides of their transverse passageways 6, 8, 9 and 11, are each respectively stopped at a cut or slot 12 which is only one-half of the depth of the intermediate plate, leaving a plate thickness, as at 13. The slots 12 are preferably of increased width, as shown, to compensate for their decreased depth so as not to reduce the effective flow area of the passageways at the crossovers. The spaced, dead-end points of the passageways 6, 8, 9 and 11 are interconnected and communicate through slots or cuts 14 which are formed in that one of the outer plates which does not back or close the grooves or slots 12. These passageway portions or slots 14 are also preferably of increased width relative to the width of the passageways in order to compensate for the decreased depth of the slots or portions 14 which are only one-half of the thickness of the outer plate. Certain of the passageways have admission or inlet ports and discharge or outlet ports opening through one or the other of the laterally abutting plates 2 and 4. Clamped or otherwise secured as by bolts or studs to the plate 2, are control devices 20, 21 and 22, such as pressure regulating and control valves having passageways therethrough communicating and with their ports registering with the admission and discharge ports in the plate member 2. A main inlet port 23 opens through the plate 2 into the conduit or passageway 8, there being a main discharge port 24, these ports 23 and 24 leading from and to a pump, not shown. The ports 25 and 26 are connected to an elevating piston cylinder 27 supported separately from the structure 1.

Referring to Figs. 9, 10 and 11, the numeral 1 designates the main plate or member 30 having the transverse passageways 31 and 32 therein, the passageway 31 having portions 33 and 34 ending respectively at spaced points on opposite sides of the passageway 32. The passageway portions 33 and 34 are joined by a bridge or cross-over passageway portion 35, formed in a cover plate member 36. The passageway 32 and portions 33 and 34 are preferably cast in the plate member 30 as open grooves, whereas the portion 35 is cast in the plate member 36 by coring or it may be drilled at converging inclinations. The plate members 30 and 36 are surface sealed as by hydrogen furnace brazing as above described.

In Fig. 12, the plate members 40 and 41 are likewise bonded as by hydrogen furnace brazing. Here, all of the passageways, and the by-pass portion as well, are formed in the one plate member 41, the plate member 40 serving solely as a cover plate.

Having thus described the invention, what is claimed and desired to be secured by Letters Patent of the United States is:

1. A new article of manufacture, comprising a laminated structure of at least three impervious members, the intermediate one of said members having an opening therethrough closed on opposite sides between spaced points of said opening by the abutting ones of said members, one of said members having an admission port to said opening at one of said spaced points, and one of said members having a discharge port from said opening at another of said spaced points.

2. A new article of manufacture, comprising a laminated structure of at least three flat heavy metal plates, means bonding the abutting plate faces in tight sealing engagement, the intermediate one of said plates having an elongated slot therethrough closed by the laterally abutting plates and forming a pressure passageway, one of said abutting plates having an inlet port communicating with said passageway at one point in its length and one of said abutting plates having an outlet port communicating with said passageway at a point spaced along said passageway from said one point.

3. A new article of manufacture, comprising a laminated structure of at least three flat heavy metal plates, means bonding the abutting plate faces in tight sealing engagement, the intermediate one of said plates having at least two elongated intersecting slots therethrough closed by the laterally abutting plates and forming intersecting pressure passageways, one of said abutting plates having an inlet port communicating with one of said passageways at one point in its length and one of said abutting plates having an outlet port communicating with said one passageway at a point spaced along said one passageway from said one point, one of said laterally abutting plates having a recess extending longitudinally of and opening into one of said passageways and extending across the intersecting passageway, and means extending transverse to said recess and separating said intersecting passageways one from the other.

4. A new article of manufacture, comprising a laminated structure of at least three flat heavy metal plates, means bonding the abutting plate faces throughout their contacting surfaces in tight sealing engagement, the intermediate one of said plates having at least two elongated slots transverse to each other therethrough and closed by the laterally abutting plates and forming pressure passageways, one of said passageways having a gap in its length, one of said abutting plates having an inlet port communicating with one of said passageways at one point in its length, and one of said abutting plates having an outlet port communicating with said one passageway at a point spaced along said one passageway from said one point, said inlet and outlet ports being on opposite sides of said gap, one of said laterally abutting plates having a recess bridging said gap and joining the spaced ends of said one passageway, and the intermediate one of said plates having a groove portion transversely across said gap and in the face adjacent the other of said laterally abutting plates.

RICHARD MOESE.

REFERENCES CITED

The following references are of record in the file of this patent:

UNITED STATES PATENTS

| Number | Name | Date |
| --- | --- | --- |
| 269,379 | Boyer | Dec. 19, 1882 |
| 1,304,197 | Nyquist | May 30, 1919 |
| 1,446,274 | Robert | Feb. 20, 1923 |
| 1,752,631 | Campbell | Apr. 1, 1930 |
| 2,114,262 | Havens | Apr. 12, 1938 |